United States Patent [19]
Latta

[11] Patent Number: 5,195,394
[45] Date of Patent: Mar. 23, 1993

[54] BICYCLE HANDLEBAR EXTENSION

[76] Inventor: Richard S. Latta, 2133 West Ave., Linwood, N.J. 08221

[21] Appl. No.: 864,787

[22] Filed: Apr. 7, 1992

[51] Int. Cl.⁵ .............................................. B62K 21/16
[52] U.S. Cl. .................................. 74/551.8; 280/288.4
[58] Field of Search ...................... 74/489, 551.1, 551.6, 74/551.8, 551.9; 403/98, 191, 234, 237; D12/178; 280/287, 288.4

[56] References Cited

U.S. PATENT DOCUMENTS

| | | | |
|---|---|---|---|
| D. 263,293 | 3/1982 | Janson | D12/178 |
| 1,448,921 | 3/1923 | Ershowitz | 74/551.8 |
| 2,059,669 | 11/1936 | Skogg | 74/551.1 |
| 5,033,325 | 7/1991 | Giard, Jr. | 74/551.8 X |
| 5,074,701 | 12/1991 | Price | 403/234 X |
| 5,145,210 | 9/1992 | Lennon | 74/551.8 X |

FOREIGN PATENT DOCUMENTS

| | | | |
|---|---|---|---|
| 381638 | 9/1923 | Fed. Rep. of Germany | 403/191 |
| 706952 | 4/1931 | France | 403/234 |

*Primary Examiner*—Richard M. Lorence
*Assistant Examiner*—Khoi Q. Ta
*Attorney, Agent, or Firm*—Laurence R. Brown

[57] ABSTRACT

A bicycle handlebar extension has an inverted U-shaped member secured at its lower ends to outer portions of a racing style handlebar and has a stabilizer strut secured between an upper crossbar of the U-shaped member and a gooseneck which mounts the handlebar on the bicycle. The stabilizer strut extends at an acute angle to a plane defined by the U-shaped member to eliminate cantilever forces on the junctions between the U-shaped member and the outer handlebar portions.

15 Claims, 3 Drawing Sheets

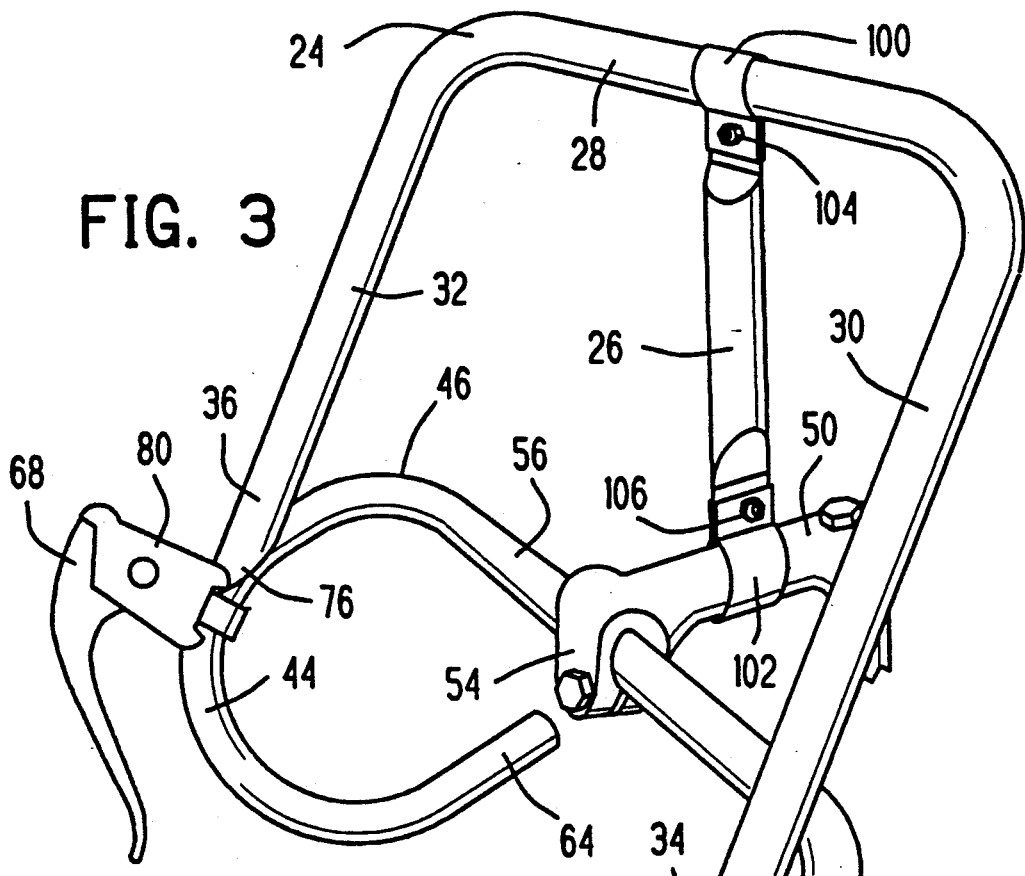
FIG. 3
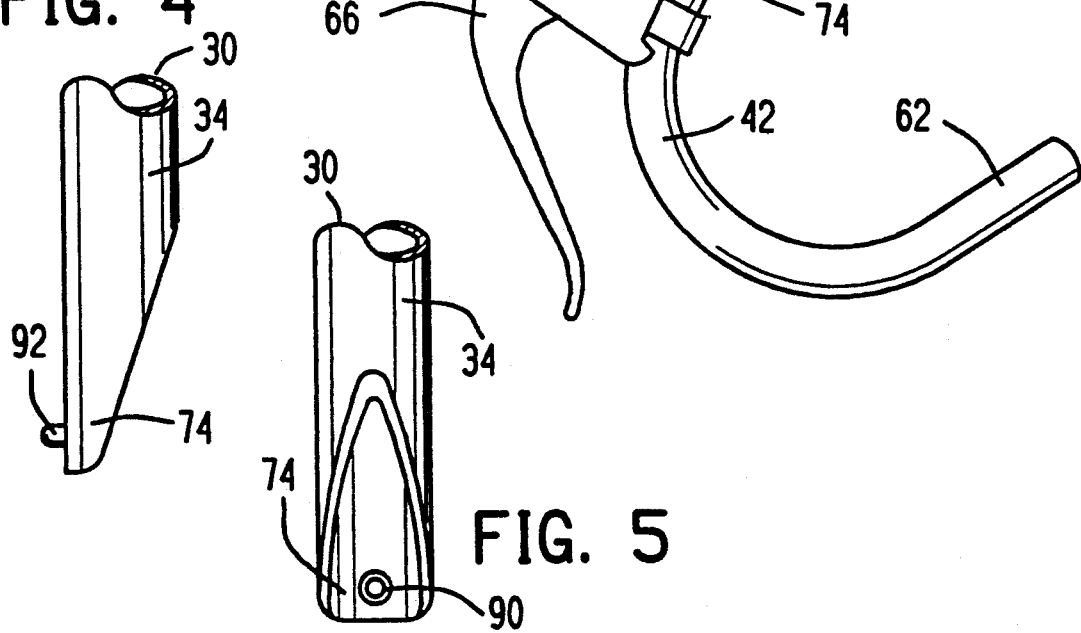
FIG. 4
FIG. 5

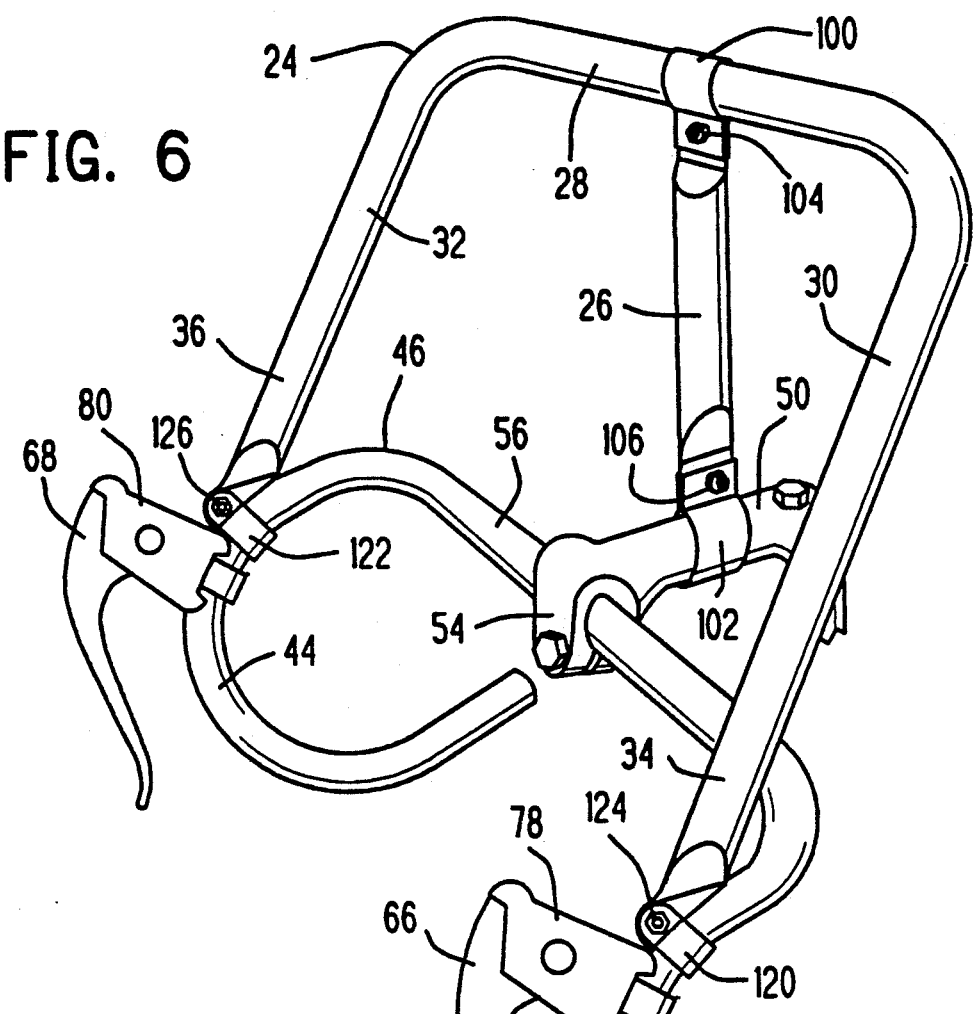
FIG. 6
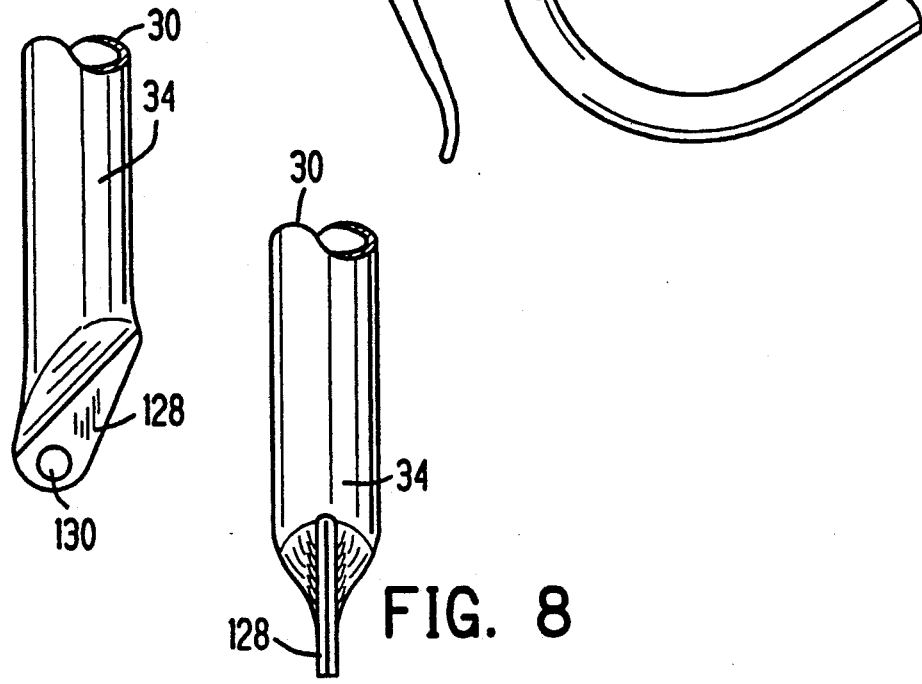
FIG. 7
FIG. 8

BICYCLE HANDLEBAR EXTENSION

TECHNICAL FIELD

This invention relates to raised extensions for bicycle handlebars, such as racing style handlebars, to enable a rider to steer the bicycle while sitting in an upright position.

BACKGROUND ART

Some types of bicycles, such as racing style bicycles, have their handlebars positioned level with or below their seats and forward of the front steering spindle so that when a rider leans forward into a horizontal position the handlebars are easily gripped by the hands of the rider. Although this horizontal position reduces wind resistance and is preferred for racing, many riders using bicycles for general transportation or for more casual recreational bicycle riding prefer to sit in an upright position. However, the relatively low and forward position of the racing style handlebars prevents riders from riding the bicycles in the upright position or at least renders such riding uncomfortable while steering the bicycles. Yet racing style bicycles are otherwise desirable for general transportation or casual recreational riding because of their popularity as well as their light weight and efficient operation.

The prior art, as exemplified in U.S. Pat. No. 263,293 and U.S. Pat. Nos. 3,760,648, 3,803,937 and 4,361,057, includes various techniques such as upper handlebar extensions and pivoting handlebars for enabling bicycles with racing style handlebars to be ridden in the more comfortable upright sitting position. The U.S. Pat. No. 263,293, in particular, shows an auxiliary bar for attachment to a racing type bicycle handlebar including a continuous generally inverted U-shaped member with its lower ends mounted in a cantilever manner by clamps on respective left and right outer portions of the handlebar. The inverted U-shaped member is bent to form vertical support posts extending upward from clamps, a pair of horizontal portions extending rearward from the support posts to or past the steering spindle, and a crossbar joining the rear ends of the rearward extending portions. Forward and rearward forces exerted on this cantilever mounted auxiliary bar during normal steering produce rotative forces on the primary handlebar about a horizontal axis to cause increased tendency for horizontal rotation within the gooseneck clamp; such rotation can cause loss of control, resulting in an accident and injury to the rider. Furthermore, the cantilever mounting of this auxiliary bar requires generally large strong clamps and strong tubular bar material to withstand the cantilever forces at the junctions between the vertical support posts and the clamps resulting in a more expensive handlebar system.

DISCLOSURE OF INVENTION

An object of the present invention is to provide a relatively inexpensive, highly stable, easily attached, upper extension for a conventional bicycle handlebar.

In accordance with this and other objects, an extension for a bicycle handlebar includes (1) a generally inverted U-shaped member having an upper crossbar and two downward extending arms with two respective free ends adapted for being easily secured to the outer portions of the bicycle handlebar, and (2) a stabilizer strut for being secured at one end to a midpoint of the crossbar and at the other end to a gooseneck or steering stem of the bicycle so that the stabilizer strut extends at an acute angle to a plane defined by the U-shaped member.

One advantage of the invention is that a stabilizer strut extending between an upper crossbar of an inverted U-shaped handlebar extension and a bicycle gooseneck at an acute angle to the plane of the U-shaped member greatly reduces susceptibility of the primary handlebar for rotation about a horizontal axis through the gooseneck clamp.

Another advantage of the invention is that a stabilizer strut extending between an upper crossbar of an inverted U-shaped handlebar extension and a bicycle gooseneck at an acute angle to the plane of the U-shaped member eliminates bending stress at the junctions mounting the lower ends of the extension on the primary handlebar.

Additional features of the invention include relatively inexpensive handlebar extension attachment facilities, such as protrusions with abutments on lower ends of the extensions for being clamped and interlocked with the conventional brake handle housings, or simple metal strap clamps attaching the extension to the handlebar.

Other objects, advantages and features of the invention will be apparent from the following description of the preferred embodiments taken in conjunction with the accompanying drawings.

BRIEF DESCRIPTION OF THE DRAWINGS

FIG. 3 is a perspective view taken from the upper left front of a handlebar and handlebar extension of the bicycle in FIG. 1.

FIG. 4 is a rotated side view of a broken away lower end portion of the handlebar extension of FIGS. 1-3.

FIG. 5 is a rear view of the broken away handlebar extension portion of FIG. 4.

FIG. 6 is a view similar to FIG. 3 but of a second variation of the handlebar extension in accordance with the invention.

FIG. 7 is a rotated side view of a broken away lower end portion of the handlebar extension of FIG. 6.

FIG. 8 is a rear view of the broken away handlebar extension portion of FIG. 7.

DESCRIPTION OF THE PREFERRED EMBODIMENTS

Figure 1:
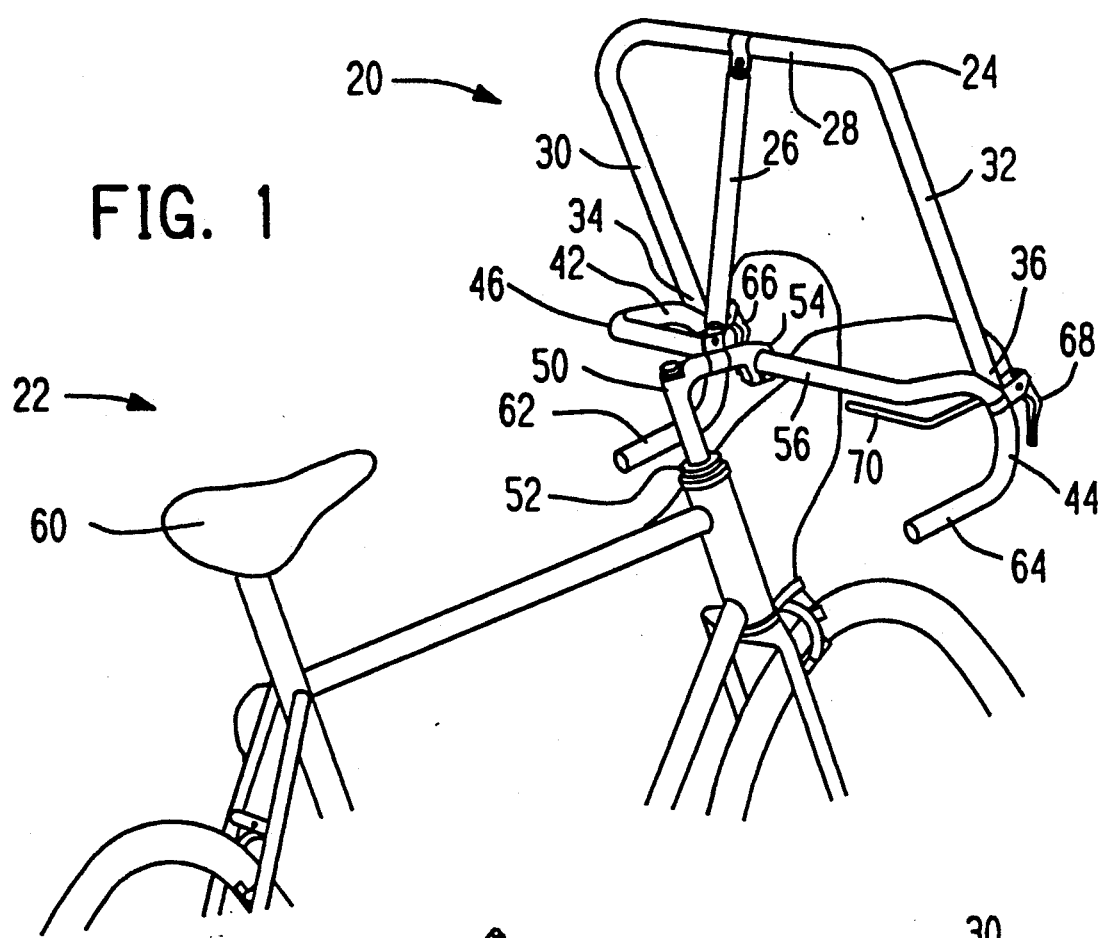
FIG. 1 is a perspective view taken from the upper right rear of an upper portion of a bicycle which includes a handlebar extension in accordance with the invention.
Figure 2:
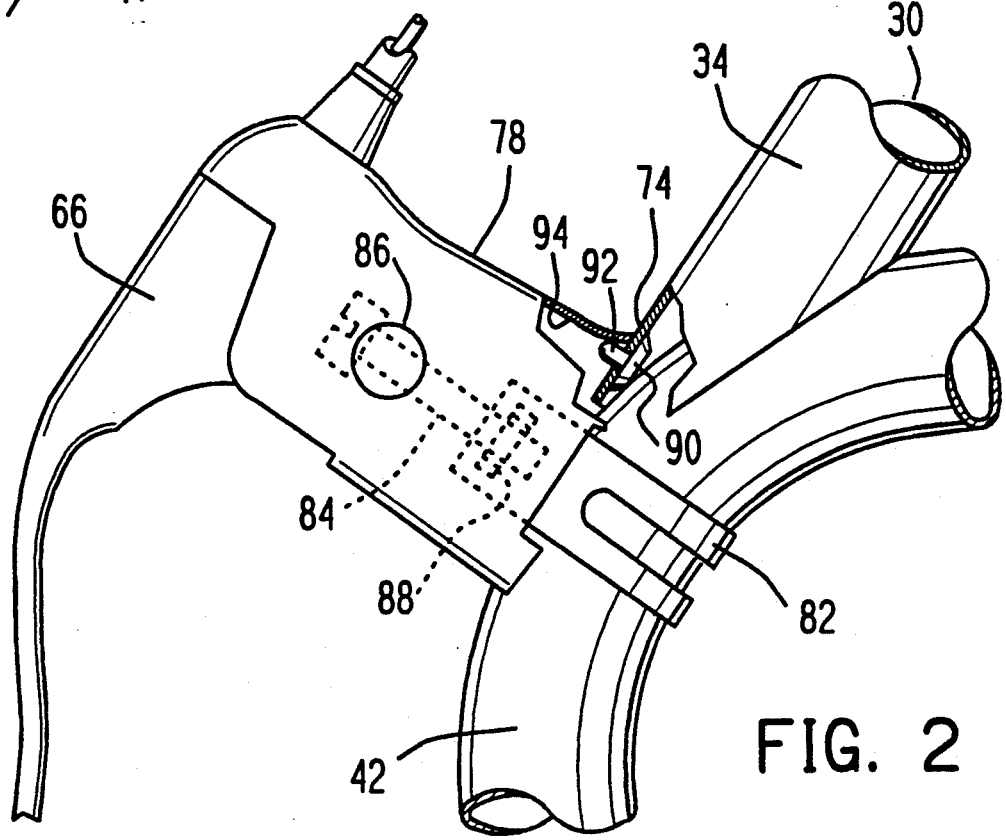
FIG. 2 is an enlarged side view of broken away portions of a bicycle handlebar, a brake handle and one lower end portion of the handlebar extension of the bicycle in FIG. 1.

As shown in FIG. 1, a handlebar extension, indicated generally at 20 and in accordance with one embodiment of the invention, is mounted on a bicycle indicated generally at 22. The extension 20 includes a generally inverted U-shaped member 24 and a stabilizer strut 26. The inverted U-shaped member 24 has an upper horizontal crossbar 28 and two arms 30 and 32 which extend downward from respective opposite ends of the crossbar. Free lower ends 34 and 36 of the arms 30 and 32 are secured to left and right outer portions 42 and 44 of a conventional primary handlebar 46 of the bicycle. The strut 26 is secured at its upper end to a midpoint of the crossbar 28 and at its lower end to a conventional gooseneck 50 which mounts the handlebar 46 on the steering spindle 52 of the bicycle. The strut 26 extends at an acute angle to a plane defined by the crossbar 28 and the arms 30 and 32 of the U-shaped member 24.

A rider sitting upright on a seat 60 of the bicycle grasps the upper portion of the U-shaped member 24, such as the crossbar 28, the curved junctions between the crossbar 28 and arms 30 and 32, or the arms 30 and 32 to steer the bicycle. In the absence of the strut 26, the normal bicycle steering or turning forces applied to the U-shaped member 24 would produce large cantilever forces at the lower ends 34 and 36 of the arms 30 and 32 tending to bend or break the lower ends of the arms and any clamps securing the lower ends to the handlebar 46 as well as producing strong rotative forces on the handlebar about a horizontal axis defined by the handlebar crosspiece 56 through the gooseneck clamp 54. The strut 26, because it extends at an oblique or acute angle to the plane of the U-shaped member and connects the upper crossbar 28 to the gooseneck 50, substantially eliminates these cantilever forces to greatly reduce susceptibility to rotation of the primary handlebar 46 about the horizontal axis through the gooseneck clamp 54 as well as tendencies for bending or breakage at clamping junctions between the handlebar 46 and the arms 30 and 32. The elimination of cantilever forces at the junctions of the arms 30 and 32 with outer handlebar portions 42 and 44 also eliminates the need for large strong clamps to mount the free lower ends 34 and 36 of the arms 30 and 32 on the handlebar as well as reducing the strength requirements for the arms 30 and 32 to withstand cantilever forces at junctions with any such clamps.

The bicycle 22 is a conventional bicycle, such as a racing style bicycle, with a racing style or drop handlebar 46 generally mounted and/or extending below the level or horizontal position of the bicycle seat 60. The outer portions 42 and 44 of the handlebar extend in a curve forward and downward from the respective left and right ends of the handlebar crosspiece 56 and terminate in lower return portions 62 and 64. Conventional brake handles 66 and 68 are mounted on the respective outer handlebar portions 42 and 44. The brake handles can optionally include conventional auxiliary handles (only one auxiliary handle 70 shown) designed to enable brake operation by the rider's hands when the hands are on the primary handlebar crosspiece 56.

The U-shaped member 24 and the strut 26 are preferably formed from metal tubing such as aluminum or steel tubing.

While the described handlebar extension 20 is particularly designed for the illustrated drop style handlebar, it can readily be adapted to other styles of handlebars where it would be beneficial to provide a handlebar extension for more comfortable riding.

The structure for mounting the lower ends 34 and 36 of the U-shaped member 24 to the outer portions 42 and 44 of the handlebar 56 is illustrated in more detail in FIGS. 2, 3, 4 and 5. Protrusions 74 and 76 on the respective lower ends 34 and 36 from brackets clamped between brake handle housings 78 and 80 and the handlebar portions 42 and 44. The protrusions 74 and 76 are formed by bias cut or ends of the metal tubing which forms member 24 so as to mate with the round cross-section and downward curvature of the handlebar portions 42 and 44. As illustrated for the brake housing 78 in FIG. 2, a strap clamp 82 of flexible metal such as stainless steel is tightened by a bolt 84 extending through an aperture in a brake handle pivot pin 86 and a nut 88 interlocked with the strap 82 to secure each brake housing on the respective handlebar portion and to clamp the corresponding protrusion 74 and 76. An abutment member, such as a rivet 90 secured in the protrusion 74 with a shaft portion 92 of the rivet protruding from the protrusion 74, is mounted on each protrusion 74 and 76 for engaging the inner wall 94 of the brake handle housing to prevent the protrusions from slipping from their clamped position between the brake housings and outer handlebar portions. The protrusions 74 and 76 formed by bias cut ends with abutment members 92 for being clamped by the conventional handlebar housings provide a relatively simple inexpensive attachment of the handlebar extension to the handlebar.

Referring back to FIG. 3, the stabilizer strut 26 has crimped or flattened upper and lower ends on which strap clamps 100 and 102 of flexible metal such as stainless steel are fastened by bolts 104 and 106. The strap clamps 100 and 102 secure the upper and lower ends of the strut 26 to the midpoint of the crossbar 28 and to the gooseneck 50, respectively.

In a variation of the handlebar extension shown in FIG. 6, strap clamps 120 and 122, formed from flexible metal such as stainless steel, with bolts 124 and 126 are used to mount the lower ends 34 and 36 of the U-shaped member 24 on the respective outer handlebar portions 42 and 44. As illustrated in FIGS. 7 and 8 for the lower end 34, the lower ends are cut and crimped at a bias to form a wing 128 with hole 130 and a suitably inclined edge for being secured by the strap clamps in engagement with the outer handlebar portions. The strap clamps 120 and 122 provide cost effective attachment of the U-shaped member 24 to the handlebar 46 compared to large strong clamps.

The cost effective attachments of the lower ends 34 and 36 of U-shaped member 24 in the embodiments of FIGS. 1-8 are made possible by the strut 26 eliminating cantilever stress on the junctions between the U-shaped member and handlebar. Without the strut 26, such attachments would readily bend and/or break under normal use.

Although not illustrated in the drawings, the primary handlebar 46 and/or the handlebar extension 24 can be provided with suitable conventional wrapped tape, rubber, and/or foamed elastic material hand grips and/or pads. Further various conventional accessories, such as a mirror, a bell, a horn, etc. (no accessories shown in drawings), can be mounted on the extension and/or primary handlebar. Also, an auxiliary brake handle system can be adapted to, fitted to, mounted on, or incorporated in the extension.

Since many variations, modifications and changes in detail can be made to the described embodiments, it is intended that the foregoing description and the accompanying drawings being interpreted as only illustrative and not limiting on the scope and spirit of the invention as defined in the following claims.

What is claimed is:

1. An extension for a handlebar held in a steering stem clamp of a bicycle having a seat and steering stem comprising a generally inverted U-shaped member having an upper crossbar and two downward extending arms of a length for extending the crossbar above said handlebar to a height grasped by a rider on the seat sitting in upright position with two respective free ends spaced for juxtaposition to respective left and right outer portions of the bicycle handlebar, means for securing the free ends of the U-shaped member to the respective left and right outer portions of the bicycle handlebar, a stabilizer strut for extending between a midpoint of the crossbar and said steering stem to prevent rotation of the handlebars about the steering stem clamp, and means for securing the stabilizer strut to the crossbar and the steering stem to hold the the U-shaped member at said height above the handlebar.

2. An extension for a handlebar as claimed in claim 1 wherein the U-shaped member is formed from a metal tube.

3. An extension for a handlebar as claimed in claim 1 further comprising brake handle housings mounted on the outer portions of the handlebar, wherein the means for securing the free ends of the U-shaped member comprises protrusions extending from the free ends of the U-shaped member to form mounting brackets for fitting between the outer handlebar portions and the respective brake handle housings mounted on the outer handlebar portions.

4. An extension for a handlebar of a bicycle as claimed in claim 3 wherein the brake handle housings are hollow with inner walls, and the means for securing the free ends of the U-shaped member further comprises abutment means mounted on distal portions of the protrusions for engaging inner wall portions of the brake handle housings to prevent slippage of the protrusions out of the brake handle housings.

5. An extension for a handlebar of a bicycle as claimed in claim 4 wherein the protrusions on the free ends of the U-shaped member comprise angled-cut end portions of the two free ends.

6. An extension for a handlebar of a bicycle as claimed in claim 1 wherein the stabilizer strut securing means comprises strap clamps for clamping the ends of the stabilizer strut to the respective crossbar and steering stem.

7. An extension for a handlebar of a bicycle as claimed in claim 1 wherein the means for securing the free ends of the U-shaped member comprises strap clamps for clamping the free ends of the U-shaped member to the respective outer portions of the handlebar.

8. An extension for a handlebar of a bicycle as claimed in claim 7 wherein the U-shaped member is formed from a metal tube.

9. An extension for a handlebar of a bicycle as claimed in claim 8 wherein the free ends of the U-shaped member are crimped and angled-cut.

10. An extension for a handlebar mounted on a bicycle handlebar as claimed in claim 1 wherein the bicycle handlebar is a racing style handlebar with a central crossbar secured to the steering stem mounted on the bicycle for riding in a horizontal position, and the left and right outer portions of the handlebar extend in an arc forward and downward from outer ends of the handlebar crossbar.

11. An extension for a handlebar of a bicycle as claimed in claim 10 wherein the U-shaped member is formed from a metal tube; and the means for securing the free ends of the U-shaped member comprises angled-cut end portions of the free ends having protrusions for being clamped between the outer handlebar portions and respective hollow brake handle housings having an inner wall, said housings being mounted on the outer handlebar portions, and abutment means mounted at the distal end of the end portions for engaging the inner wall of the brake handle housings to prevent slippage of the protrusions out of the brake handle housings.

12. An extension for a handlebar of a bicycle as claimed in claim 11 wherein the protrusions comprise rivets secured in the angled-cut end portions having shaft portions protruding from the bias cut end portions for engaging the inner wall of the brake handle housings.

13. An extension for a handlebar of a bicycle as claimed in claim 11 wherein the means for securing the free ends of the U-shaped member further comprise strap clamps for clamping the free ends of the U-shaped member to the respective outer portions of the handlebar.

14. An extension for a handlebar of a bicycle as claimed in claim 13 wherein the free ends of the U-shaped member are crimped and angled-cut.

15. An extension for a handlebar of a bicycle as claimed in claim 1 wherein the extension is mounted on the bicycle handlebar and steering stem with the strut extending at an acute angle to a plane defined by the U-shaped member.

* * * * *